United States Patent
Tadiello et al.

(10) Patent No.: US 11,014,812 B2
(45) Date of Patent: May 25, 2021

(54) PROCESS AND PLANT FOR PRODUCING HYDROGEN BY MEANS OF CATALYTIC STEAM REFORMATION OF A HYDROCARBONACEOUS FEED GAS

(71) Applicant: L'Air Liquide, Societe Anonyme pour l'Etude et l'Exploitation des Procedes Georges Claude, Paris (FR)

(72) Inventors: Jean-Philippe Tadiello, Frankfurt am Main (DE); Taekyu Kang, Newark, DE (US); Thomas Wenz, Dusseldorf (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 102 days.

(21) Appl. No.: 16/093,865

(22) PCT Filed: Apr. 12, 2017

(86) PCT No.: PCT/EP2017/025087
§ 371 (c)(1),
(2) Date: Oct. 15, 2018

(87) PCT Pub. No.: WO2017/182139
PCT Pub. Date: Oct. 26, 2017

(65) Prior Publication Data
US 2019/0112189 A1  Apr. 18, 2019

(30) Foreign Application Priority Data

Apr. 22, 2016 (EP) .................. 16400011.9

(51) Int. Cl.
*C01B 3/38* (2006.01)
*C01B 3/56* (2006.01)
*B01D 53/047* (2006.01)

(52) U.S. Cl.
CPC ............ *C01B 3/384* (2013.01); *B01D 53/047* (2013.01); *C01B 3/56* (2013.01); *B01D 2256/16* (2013.01);
(Continued)

(58) Field of Classification Search
CPC ...................................................... C01B 3/384
See application file for complete search history.

(56) References Cited

U.S. PATENT DOCUMENTS 4,698,136 A * 10/1987 El-Allawy ........... B01D 17/048
 203/11
4,833,171 A * 5/1989 Sweeney ................... C01B 3/36
 252/373

(Continued)

FOREIGN PATENT DOCUMENTS

| DE | 10 2004 030246 | 1/2006 |
| DE | 10 2010 020406 | 6/2011 |
| DE | 10 2010 044939 | 12/2011 |

OTHER PUBLICATIONS

International Search Report and Written Opinion for PCT/EP2017/025087, dated Jun. 30, 2017.

*Primary Examiner* — Paul A Wartalowicz
(74) *Attorney, Agent, or Firm* — Justin K. Murray

(57) ABSTRACT

Plant and process for the generation of hydrogen from a hydrocarbonaceous feed gas and steam by means of catalytic steam reformation, wherein the heat of the synthesis gas and the flue gas is utilized for generating export steam from boiler feed water and process steam from the condensate separated from the synthesis gas, and wherein the gases expelled from the boiler feed water during its degasification and the vapors obtained during the depressurization of the elutriation waters of the steam boilers for the generation of (Continued)

export and process steam are used for preheating the fuel gas for operation of the burners of the steam reformer.

5 Claims, 1 Drawing Sheet

(52) U.S. Cl.
CPC  *B01D 2257/502* (2013.01); *C01B 2203/0233* (2013.01); *C01B 2203/043* (2013.01); *C01B 2203/0816* (2013.01); *C01B 2203/0827* (2013.01); *C01B 2203/0894* (2013.01); *C01B 2203/1241* (2013.01)

(56) References Cited

U.S. PATENT DOCUMENTS

| | | |
|---|---|---|
| 2011/0100214 A1 | 5/2011 | Grover |
| 2011/0239864 A1 | 10/2011 | Marty et al. |
| 2012/0148485 A1 | 6/2012 | Morrow et al. |

* cited by examiner

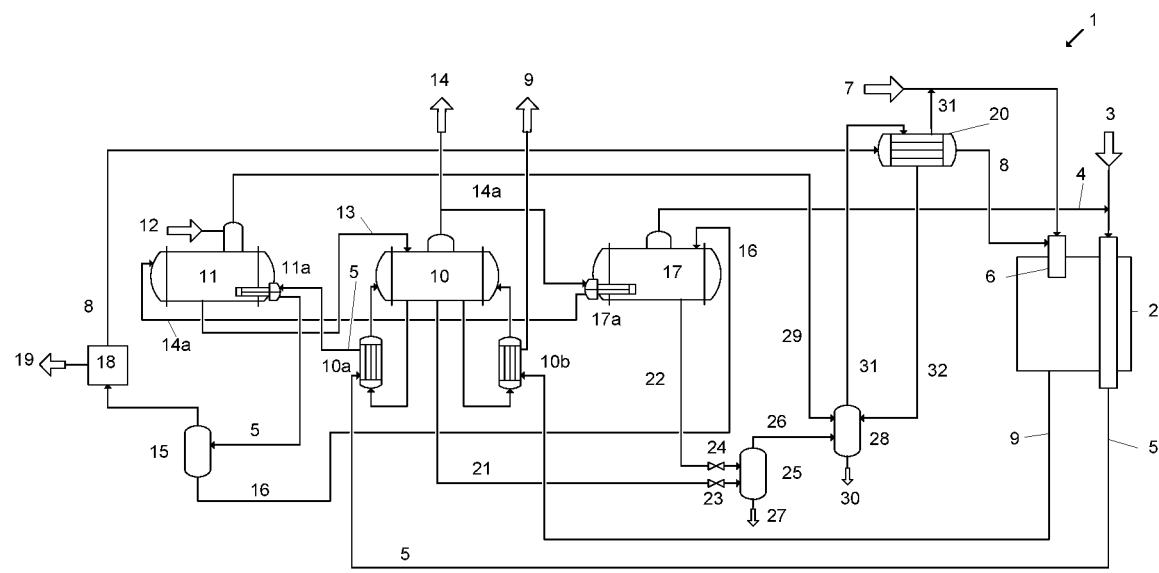

PROCESS AND PLANT FOR PRODUCING HYDROGEN BY MEANS OF CATALYTIC STEAM REFORMATION OF A HYDROCARBONACEOUS FEED GAS

CROSS REFERENCE TO RELATED APPLICATIONS

This application is a § 371 of International PCT Application PCT/EP2017/025087, filed Apr. 12, 2017, which claims the benefit of EP16400011.9, filed Apr. 22, 2016, both of which are herein incorporated by reference in their entireties.

Field of the Invention

The invention relates to a process for producing hydrogen from a hydrocarbonaceous feed gas and steam, comprising the following process steps:

conversion of a hydrocarbonaceous feed gas by steam reformation into a synthesis gas chiefly consisting of hydrogen and carbon monoxide, wherein process steam is used for the steam reformation and wherein the reformation is carried out in a reformer furnace which is equipped with reformer tubes filled with catalyst and burners heating the same, which are operated with process-internally produced fuel gas and/or hydrocarbonaceous feed gas and with an oxygen-containing feed gas, wherein a flue gas is produced, cooling of the produced synthesis gas to a temperature which is suitable for the treatment of the synthesis gas for the separation of hydrogen by the PSA (pressure swing adsorption) process, wherein cooling of the synthesis gas comprises its use as heat-transfer medium for generating export steam and/or process steam and/or for the thermal degasification of boiler feed water by forming aqueous condensate in the synthesis gas, wherein the generation of export steam and/or process steam and/or the thermal degasification of boiler feed water is carried out in containers from which vent streams and/or elutriation streams are discharged, separation of the hydrogen from the cooled synthesis gas by using the PSA process, wherein a clean hydrogen gas and a PSA residual gas are obtained, discharge of the clean hydrogen gas as process product, recirculation of the PSA residual gas as fuel gas for operation of the burners of the reformer furnace.

This invention furthermore relates to a plant for carrying out this process.

BACKGROUND OF THE INVENTION

Such processes and plants are known per se. The underlying process for the catalytic steam reformation of a hydrocarbonaceous feed gas is described for example in Ullmanns Encyclopedia of Industrial Chemistry, Sixth Edition, Vol. 15, Gas Production, Chapter 2. The feed gases, a hydrocarbonaceous gas, such as e.g. natural gas and steam, are passed through externally heated reactor tubes filled with catalyst at elevated pressure, e.g. at 20 to 35 bar, and high temperature, e.g. 800 to 950° C. The feed gases are converted into synthesis gas rich in hydrogen and carbon monoxide. Such tubular reactor frequently is referred to as SMR, and the process is referred to as SMR process (abbreviation for Steam-Methane-Reformer), when natural gas is used as feed gas. For the separation of the hydrogen fraction from the synthesis gas the pressure swing adsorption (PSA) process frequently is employed, which is described in chapter 5.5.3 of the same Ullmann volume.

For the economy of the process it is very important to use the heating energy expended for heating the feed gases and for carrying out the, in total, endothermal reforming reactions as far as possible for steam generation. The steam used together with the hydrocarbonaceous feed gas is referred to as process steam. It is obtained by re-evaporating the condensate, the so-called process condensate, which is formed and deposited from the synthesis gas upon cooling thereof. The heat content of the synthesis gas and of the flue gas however exceeds the heat quantity required for generating the process steam. To make good use of this excess heat, the same is utilized for generating so-called export steam, which chiefly is used outside the SMR process. In order not to load the export steam with impurities from the SMR process, fresh boiler feed water is used for its generation. A part of the export steam is utilized to compensate elutriation losses during the generation of process steam.

Processes and plants for the optimization of this heat recovery are described e.g. in the following applications and patent specifications:

DE 10 2004 030 246 A1 describes a process and an apparatus for obtaining hydrogen by steam reformation, in which the boiler feed water stream supplied to the degassing boiler is heated by the stream discharged from the boiler, by means of a heat exchanger.

DE 10 2010 020 406 A1 describes a process for producing a synthesis gas, in which there is shown the heat recovery from the produced flue gas of the SMR reformer by heat exchange with the feed gases, natural gas and air, and by steam generation.

DE 10 2010 044 939 B3 describes a process for generating process steam and boiler feed water steam in a reforming reactor for the production of synthesis gas. There is shown the heat recovery by heat exchange between the process product streams synthesis gas and flue gas and the educt streams.

Before its evaporation, the boiler feed water used for the generation of export steam is liberated from gases contained therein. This is accomplished by thermal degasification. For this purpose, it is brought to boil in a boiler under slight excess pressure. The expelled gas mostly is discharged into the atmosphere. An alternative to discharging into the atmosphere is presented in the document US 2011/0239864 A1. In this document it is proposed to admix these gases to the hot flue gas, in order to thereby destroy harmful constituents of the gas. A secondary aspect of the present invention consists in offering an alternative thereto.

Another secondary aspect of the invention consists in increasing the utilization of the thermal energy expended for the steam reforming process. A small part of the water continuously is elutriated from the steam boilers, in order to avoid an accumulation of impurities. These elutriation waters are discharged from the boilers by pressure release. In the processes and plants of the prior art, the vapor obtained during the depressurization is discharged into the atmosphere.

SUMMARY OF THE INVENTION

The object substantially is solved by the process according to claim 1 and by a plant according to the invention with the features of claim 7.

Process According to the Invention

A process for producing hydrogen from a hydrocarbonaceous feed gas and steam, comprising the following process steps:

a) conversion of a hydrocarbonaceous feed gas by steam reformation into a synthesis gas chiefly consisting of hydrogen and carbon monoxide, wherein process steam is used for the steam reformation and wherein the reformation is carried out in a reformer furnace which is equipped with reformer tubes filled with catalyst and burners heating the same, which are operated with process-internally produced fuel gas and/or hydrocarbonaceous feed gas and with an oxygen-containing feed gas, wherein a flue gas is produced, b) cooling of the synthesis gas produced in part a) to a temperature which is suitable for the treatment of the synthesis gas for the separation of hydrogen according to the PSA (pressure swing adsorption) process, wherein cooling of the synthesis gas comprises its use as heat-transfer medium for generating export steam and/or process steam and/or for the thermal degasification of boiler feed water by forming aqueous condensate in the synthesis gas, wherein the generation of export steam and/or process steam and/or the thermal degasification of boiler feed water is carried out in containers from which vent streams and/or elutriation streams are discharged, c) separation of the hydrogen from the synthesis gas cooled according to step b) by using the PSA process, wherein a clean hydrogen gas and a PSA residual gas are obtained, discharge of the clean hydrogen gas as process product, recirculation of the PSA residual gas as fuel gas to step a), wherein in step c) the PSA residual gas is heated by indirect heat exchange with one or more of the elutriation streams and/or vent streams.

Plant According to the Invention

Plant for producing hydrogen from a hydrocarbonaceous feed gas and steam, comprising:

a reformer furnace which is equipped with reformer tubes filled with catalyst and burners heating the same, wherein the burners are suitable for operation with process-internally produced fuel gas and/or hydrocarbonaceous feed gas and with an oxygen-containing feed gas, discharge conduits for synthesis gas produced in the reformer furnace and flue gas, at least one cooling device for cooling the synthesis gas produced in the reformer furnace, wherein the cooling device is in a heat-exchange relationship with at least one container for the generation of export steam and/or process steam and/or the thermal degasification of boiler feed water, wherein the at least one container comprises discharge conduits for vent streams and/or elutriation streams, a PSA plant, comprising a feed conduit for cooled synthesis gas and discharge conduits for a clean hydrogen gas and a PSA residual gas, as well as a return conduit for recirculating the PSA residual gas to the burners, wherein a heating device for heating the PSA residual gas by indirect heat exchange with at least one elutriation stream and/or vent stream.

Due to the heat exchange according to the invention the residual gas, which in many cases leaves the PSA plant with about 30° C., can be heated to approximately 80° C. and thus be supplied to the burners of the SMR reformer as fuel gas.

PREFERRED ASPECTS OF THE INVENTION

A preferred aspect of the process according to the invention consists in that cooling of the synthesis gas also comprises the heat exchange with ambient air and/or cooling water. In this way cooling can be performed, in part independent of the requirements of the steam generation.

Another preferred aspect of the process according to the invention consists in that the flue gas produced according to claim 1, step a), also is cooled due to its use as heat-transfer medium in the generation of export and/or process steam. In this way, the thermal energy present in the flue gas also is utilized.

Another preferred aspect of the process according to the invention consists in that the condensate formed in the synthesis gas is mechanically separated and used as feed material for the generation of process steam. The mechanical separation of condensate is well established for a long time and does not incur too high energy and investment costs.

Another preferred aspect of the process according to the invention consists in that the elutriation streams are depressurized, the resulting depressurizing gases and depressurizing vapors are separated and used for heating the residual gas by indirect heat exchange. Since this depressurizing step anyway is necessary, in order to discharge the elutriation streams from the process, no additional expenditure is incurred. The transport of the depressurizing gases and vapors to the heat exchanger used for heating the residual gas merely requires pipe conduits and no pump, as it would be necessary in many cases for the transport of the liquid elutriation streams.

Another preferred aspect of the process according to the invention consists in that after the heat exchange with the PSA residual gas the depressurizing gases and depressurizing vapors and the vent streams are admixed to the oxygen-containing feed gas which is used for the operation of the burners. Constituents harmful to health and the environment are destroyed by combustion, i.e. chiefly converted into carbon dioxide and steam, which can be output to the environment along with the flue gas.

A preferred aspect of the plant according to the invention consists in that it includes at least one heat exchanger for cooling the synthesis gas by heat exchange with ambient air and/or cooling water. By means of such technical equipment cooling can be carried out in a way more independent of the requirements of steam generation.

Another preferred aspect of the plant according to the invention consists in that it comprises a heat exchanger for cooling the flue gas, wherein the heat exchanger for cooling the flue gas is in a heat-exchange relationship with at least one container for the generation of export steam and/or process steam and/or the thermal degasification of boiler feed water. It is advantageous when the heat exchanger protrudes into the channel for discharging the flue gas from the reformer, so that flue gas directly flows around the heat-exchange surfaces.

Another preferred aspect of the plant according to the invention consists in that the plant comprises a mechanical separating device for separating the condensate formed in the synthesis gas, as well as a conduit for discharging the condensate from the separating device and a conduit for feeding the condensate to a container for the generation of process steam. A mechanical droplet separation is advantageous, as it is well established for a long time and does not incur too high energy and investment costs.

Another preferred aspect of the plant according to the invention consists in that it comprises a depressurizing device for depressurizing the at least one elutriation stream, a separating device for separating the depressurizing gases and depressurizing vapors produced during the depressurization of the at least one elutriation stream, and a heat exchanger for carrying out an indirect heat exchange between the depressurizing gases and depressurizing vapors and the PSA residual gas. This aspect is advantageous, as the depressurization of the elutriation streams anyway is required to discharge the same from the process and no additional expenditure is incurred by the depressurizing device. It furthermore is advantageous that the transport of the depressurizing gases and vapors to the heat exchanger used for heating the residual gas merely requires pipe conduits and no pump, as it would be necessary in many cases for the transport of the liquid elutriation streams.

Another preferred aspect of the plant according to the invention consists in that it comprises a discharge conduit for the depressurizing gases and/or depressurizing vapors and/or vent streams after carrying out the heat exchange with the PSA residual gas and a mixing device for admixing these gases and/or vapors to the oxygen-containing feed gas for the operation of the burners. It is advantageous that this discharge conduit provides for destroying constituents harmful to health and the environment by combustion, wherein they are chiefly converted into carbon dioxide and steam, which can be output to the environment along with the flue gas.

BRIEF DESCRIPTION OF THE DRAWINGS

Further features, advantages and possible applications of the invention can also be taken from the following description of an exemplary embodiment and numerical example as well as the drawing. All features described and/or illustrated form the subject-matter of the invention per se or in any combination, independent of their inclusion in the claims or their back-reference.

The process according to the invention will be explained below with reference to the FIGURE of the drawing, in which:

The FIGURE shows a flow diagram of an exemplary embodiment of the plant according to the invention.

DETAILED DESCRIPTION OF THE INVENTION

The flow diagram represented in the FIGURE shows an exemplary embodiment of the plant 1 according to the invention for producing hydrogen from a hydrocarbonaceous feed gas, such as e.g. natural gas and steam. There are only shown the parts of the plant or the process which are essential for an understanding of the invention.

In the SMR reformer 2 designed as tubular furnace the feed gas consisting of natural gas 3 and process steam 4 is converted into synthesis gas 5 chiefly consisting of carbon monoxide and hydrogen. The SMR reformer 2 is heated by means of burners 6, of which only one is shown here, which are operated with air 7 and fuel gas 8, wherein a flue gas 9 is produced. To utilize the heat contained in the synthesis gas 5 and in the flue gas 9, the same are used as heat-transfer medium for heating the steam boiler 10, by means of the heat exchangers 10a and 10b, and the synthesis gas 5 in addition is also used for heating the degassing boiler 11, by means of the heat exchanger 11a. In the degassing boiler 11 boiler feed water 12 is thermally degassed and via conduit 13 fed into the steam boiler 10 in which it is evaporated to export steam 14. The flue gas 9 subsequently is discharged from the process for the further treatment. In the condensate separator 15 aqueous condensate 16 formed in the synthesis gas is separated and introduced into steam boilers 17. It is evaporated there to process steam 4 by means of the heat exchanger 17a, wherein a partial stream of the export steam 14a is used as heat-transfer medium and subsequently introduced into the degassing boiler 11. After the condensate separation, the synthesis gas 5 is treated in the PSA plant 18, wherein the hydrogen fraction 19 is separated from the synthesis gas and discharged from the plant or from the process as product for the further treatment. The residual gas 8 remaining after the hydrogen separation is heated in the heat exchanger 20 and supplied to the burners 6 of the SMR reformer 2 as fuel gas.

From the steam boilers 10 and 17 the elutriation waters 21 and 22 are introduced into the liquid-gas separator 25. The elutriation waters are depressurized in the valves 23 and 24, respectively. Due to the depressurization a part of the waters is evaporated. In the separator 25 the liquid and vapor phases are separated. The vapor phase is passed into the condensate separator 28 via conduit 26. The aqueous phase is discharged from the separator 25 and supplied to the further treatment as stream 27. The gases and vapors separated from the boiler feed water 12 likewise are introduced into the condensate separator 28 as stream 29. In the condensate separator 28 the gas and vapor streams 26 and 29 are mixed, condensate is separated and supplied to a further treatment as stream 30. The gas-vapor phase 31 is introduced into the heat exchanger 20, where it heats the residual or fuel gas stream 8. Condensate formed thereby is separated from phase 31 in the heat exchanger 20 and recirculated into the condensate separator 28 as stream 32. After leaving the heat exchanger 20 the remaining gaseous part of the stream 31 is introduced into the air stream 7 and supplied therewith to the combustion.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

INDUSTRIAL APPLICABILITY

By means of the invention the amount of process-internally reused thermal energy is increased in this already commercially established process for the generation of hydrogen. The invention therefore is industrially applicable.

LIST OF REFERENCE NUMERALS 1 plant according to the invention:
2 SMR reformer
3 natural gas stream
4 process steam
5 synthesis gas
6 burner
7 air for combustion
8 residual/fuel gas
9 flue gas
10 steam boiler for export steam, with heat exchangers 10a, b
11 degassing boiler with heat exchanger 11a
12 boiler feed water, fresh
13 boiler feed water, degassed
14 export steam, partial stream export steam 14a
15 condensate separator
16 condensate
17 steam boiler for process steam, with heat exchanger 17a
18 residual/fuel gas
19 hydrogen
20 heat exchanger
21 elutriation water
22 elutriation water
23 valve
24 valve
25 liquid-gas separator
26 vapor phase
27 aqueous phase
28 condensate separator
29 separated gases
30 condensate
31 gas-vapor phase
32 condensate

The invention claimed is:

1. A process for producing hydrogen from a hydrocarbonaceous feed gas and steam, the process comprising the following process steps:
    introducing a feed gas comprising natural gas and steam to a steam methane reformer (SMR) under conditions effective to produce synthesis gas, wherein the SMR comprises burners that are configured to provide heat via combustion of a fuel gas and an oxidant, wherein the combustion of the fuel gas and the oxidant form a flue gas;
    withdrawing the flue gas and the synthesis gas from the SMR;
    heating a steam boiler to form export steam using the flue gas and the synthesis gas withdrawn from the SMR as heat transfer mediums;
    heating a degassing boiler using the synthesis gas to form a cooled synthesis gas stream;
    introducing the cooled synthesis gas stream to a first phase separator under conditions effective for separating aqueous condensate formed in the cooled synthesis gas;
    withdrawing the aqueous condensate from the first phase separator and introducing the aqueous condensate to a process steam boiler, wherein the aqueous condensate is heated and turned into process steam;
    withdrawing a dry synthesis gas stream from the first phase separator;
    introducing the dry synthesis gas stream into a pressure swing adsorber (PSA) plant under conditions effective for producing a hydrogen stream and a PSA residual gas;
    heating the PSA residual gas in a heat exchanger by indirect heat exchanger against a heating gas, and then combusting the heated PSA residual gas, along with the fuel gas and the oxidant, in the burners of the SMR, wherein the heating gas is selected from the group consisting of a venting gas from the degassing boiler, a first elutriation stream from the steam reboiler, a second elutriation stream from the process steam boiler, and combinations thereof.

2. The process according to claim 1, furthermore comprising the steps of:
    withdrawing the venting gas stream from the degassing boiler;
    withdrawing the first elutriation stream from the steam boiler;
    withdrawing the second elutriation stream from the process steam boiler;
    depressurizing the first elutriation stream and the second elutriation stream to form a two-phase first elutriation stream and a two-phase second elutriation stream and then introducing the two-phase first elutriation stream and two-phase the second elutriation stream into a second phase separator under conditions effective to produce a top vapor stream and a bottoms liquid stream;
    introducing the top vapor stream from the second phase separator and the venting gas from the degassing boiler to a condensate separator to produce a gaseous vapor stream;
    withdrawing the gaseous vapor stream from the condensate separator and introducing the gaseous vapor stream to the heat exchanger, wherein the gaseous vapor stream is used to heat the PSA residual gas via indirect heat exchange.

3. The process according to claim 2, wherein at least part of the gaseous vapor stream condenses within the heat exchanger when exchanging heat with the PSA residual gas.

4. The process according to claim 3, further comprising the step of returning the condensed gaseous vapor from the heat exchanger to the condensate separator.

5. The process according to claim 3, further comprising the step of mixing the non-condensed portion of the gaseous vapor stream from the heat exchanger with the oxidant stream for combustion in the burners of the SMR.

* * * * *